(12) United States Patent
Eleftheriadis et al.

(10) Patent No.: US 8,531,608 B2
(45) Date of Patent: Sep. 10, 2013

(54) OBJECT-BASED AUDIO-VISUAL TERMINAL AND BITSTREAM STRUCTURE

(75) Inventors: Alexandros Eleftheriadis, Tenafly, NJ (US); Hari Kalva, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 12/885,687

(22) Filed: Sep. 20, 2010

(65) Prior Publication Data

US 2011/0007219 A1    Jan. 13, 2011

Related U.S. Application Data

(60) Continuation of application No. 12/482,292, filed on Jun. 10, 2009, now Pat. No. 8,115,873, which is a continuation of application No. 11/688,368, filed on Mar. 20, 2007, now Pat. No. 8,421,923, which is a division of application No. 09/367,433, filed as application No. PCT/US98/02668 on Feb. 13, 1998, now Pat. No. 7,199,836.

(60) Provisional application No. 60/037,779, filed on Feb. 14, 1997.

(51) Int. Cl.
    *H04N 5/262* (2006.01)
(52) U.S. Cl.
    USPC ........ 348/584; 348/598; 348/578; 348/423.1; 348/722; 715/723
(58) Field of Classification Search
    USPC ...... 348/578, 584, 598, 722, 423.1; 382/284; 345/630; 715/723
    See application file for complete search history.

(56) References Cited

U.S. PATENT DOCUMENTS

| | | | |
|---|---|---|---|
| 5,428,732 | A | 6/1995 | Hancock et al. |
| 5,430,485 | A | 7/1995 | Lankford et al. |
| 5,515,485 | A | 5/1996 | Luquet et al. |
| 5,521,922 | A | 5/1996 | Fujinami et al. |
| 5,537,157 | A | 7/1996 | Washino et al. |
| 5,548,346 | A | 8/1996 | Mimura et al. |
| 5,557,342 | A | 9/1996 | Eto et al. |
| 5,778,098 | A | 7/1998 | Lee et al. |
| 5,784,620 | A | 7/1998 | Isham |
| 5,822,460 | A | 10/1998 | Kim |
| 5,826,102 | A | 10/1998 | Escobar et al. |
| 5,852,669 | A | 12/1998 | Eleftheriadis et al. |
| 5,872,565 | A | 2/1999 | Greaves et al. |

(Continued)

OTHER PUBLICATIONS

U.S. Appl. No. 12/885,687, filed Sep. 20, 2010.

(Continued)

*Primary Examiner* — Jefferey Harold
*Assistant Examiner* — Jean W Desir
(74) *Attorney, Agent, or Firm* — Baker Botts, L.L.P.

(57) ABSTRACT

As information to be processed at an object-based video or audio-visual (AV) terminal, an object-oriented bitstream includes objects, composition information, and scene demarcation information. Such bitstream structure allows on-line editing, e.g. cut and paste, insertion/deletion, grouping, and special effects. In the interest of ease of editing, AV objects and their composition information are transmitted or accessed on separate logical channels (LCs). Objects which have a lifetime in the decoder beyond their initial presentation time are cached for reuse until a selected expiration time. The system includes a de-multiplexer, a controller which controls the operation of the AV terminal, input buffers, AV objects decoders, buffers for decoded data, a composer, a display, and an object cache.

18 Claims, 5 Drawing Sheets

(56) References Cited

U.S. PATENT DOCUMENTS

| | | | |
|---|---|---|---|
| 5,880,792 | A | 3/1999 | Ward et al. |
| 5,896,176 | A | 4/1999 | Das et al. |
| 6,026,195 | A | 2/2000 | Eifrig et al. |
| 6,037,988 | A | 3/2000 | Gu et al. |
| 6,047,088 | A | 4/2000 | van Beek et al. |
| 6,055,330 | A | 4/2000 | Eleftheriadis et al. |
| 6,069,669 | A | 5/2000 | Park et al. |
| 6,079,566 | A | 6/2000 | Eleftheriadis et al. |
| 6,084,912 | A | 7/2000 | Reitmeier et al. |
| 6,092,107 | A | 7/2000 | Eleftheriadis et al. |
| 6,108,042 | A | 8/2000 | Adams et al. |
| 6,134,269 | A | 10/2000 | Puri et al. |
| 6,259,828 | B1 | 7/2001 | Crinon et al. |
| 6,339,618 | B1 | 1/2002 | Puri et al. |
| 6,414,678 | B1 | 7/2002 | Goddard et al. |
| 6,526,177 | B1 | 2/2003 | Haskell et al. |
| 6,549,659 | B1 | 4/2003 | Welch et al. |
| 6,621,932 | B2 | 9/2003 | Hagai et al. |
| 6,621,939 | B1 | 9/2003 | Negishi et al. |
| 7,095,450 | B1 | 8/2006 | Holmes et al. |
| 7,199,836 | B1 | 4/2007 | Eleftheriadis et al. |
| 2003/0165271 | A1 | 9/2003 | Boon |
| 2012/0105727 | A1 | 5/2012 | Eleftheriadis et al. |

OTHER PUBLICATIONS

U.S. Appl. No. 09/367,433, Nov. 29, 2006 Notice of Allowance.
U.S. Appl. No. 09/367,433, Sep. 11, 2006 Appeal Brief Filed.
U.S. Appl. No. 09/367,433, May 30, 2006 Request Pre-Appeal Brief and Notice of Appeal Filed.
U.S. Appl. No. 09/367,433, Feb. 23, 2006 Final Office Action.
U.S. Appl. No. 09/367,433, Nov. 23, 2005 Response to Non-Final Office Action.
U.S. Appl. No. 09/367,433, May 20, 2005 Non-Final Office Action.
U.S. Appl. No. 09/367,433, Apr. 28, 2005 Request for Continued Examination (RCE) and Response to Final Office Action.
U.S. Appl. No. 09/367,433, Mar. 24, 2005 Advisory Action.
U.S. Appl. No. 09/367,433, Feb. 28, 2005 Response to Final Office Action.
U.S. Appl. No. 09/367,433, Dec. 29, 2004 Final Office Action.
U.S. Appl. No. 09/367,433, Sep. 7, 2004 Response to Non-Final Office Action.
U.S. Appl. No. 09/367,433, Mar. 29, 2004 Non-Final Office Action.
U.S. Appl. No. 09/367,433, Dec. 18, 2003 Reponse to Non-Final Office Action.
U.S. Appl. No. 09/367,433, Sep. 15, 2003 Non-Final Office Action.
U.S. Appl. No. 12/482,292, Jan. 18, 2011 Response to Non-Final Office Action.
U.S. Appl. No. 12/482,292, Sep. 17, 2010 Non-Final Office Action.
U.S. Appl. No. 09/850,914 (Abandoned), filed May 8, 2001.
U.S. Appl. No. 09/067,015 (US 6,292,805), filed Apr. 28, 1998 (Sep. 18, 2001).
U.S. Appl. No. 09/055,934 (US 6,092,107), filed Apr. 7, 1998 (Jul. 18, 2000).
U.S. Appl. No. 09/297,714 (US 6,512,775), filed Jul. 2, 1999 (Jan. 28, 2003).
U.S. Appl. No. 09/553,884 (Abandoned), filed Apr. 20, 2000.
U.S. Appl. No. 08/723,467 (US 6,055,330), filed Oct. 9, 1996 (Apr. 25, 2000).
U.S. Appl. No. 09/055,929 (US 6,044,397), filed Apr. 7, 1998 (Mar. 28, 2000).
U.S. Appl. No. 09/240,509 (US 7,149,770), filed Jan. 29, 1999 (Dec. 12, 2006).
U.S. Appl. No. 09/530,085 (Abandoned), filed Apr. 20, 2000.
U.S. Appl. No. 10/149,711 (Abandoned), filed Jun. 12, 2002.
U.S. Appl. No. 11/688,368, filed Mar. 20, 2007.
U.S. Appl. No. 12/482,292, filed Jun. 10, 2009.
U.S. Appl. No. 09/367,433 (US 7,199,836), filed Jan. 13, 2000 (Apr. 3, 2007).
U.S. Appl. No. 09/850,914, Mar. 1, 2010 Notice of Abandonment.
U.S. Appl. No. 09/850,914, May 28, 2009 Final Office Action.
U.S. Appl. No. 09/850,914, Mar. 2, 2009 Response to Non-Final Office Action.
U.S. Appl. No. 09/850,914, Oct. 6, 2008 Non-Final Office Action.
U.S. Appl. No. 09/850,914, Jul. 23, 2008 Amendment and Request for Continued Examination (RCE).
U.S. Appl. No. 09/850,914, Jan. 23, 2008 Final Office Action.
U.S. Appl. No. 09/850,914, Nov. 14, 2007 Response to Non-Final Office Action.
U.S. Appl. No. 09/850,914, Jul. 20, 2007 Non-Final Office Action.
U.S. Appl. No. 09/850,914, May 2, 2007 Amendment and Request for Continued Examination (RCE).
U.S. Appl. No. 09/850,914, Nov. 2, 2006 Final Office Action.
U.S. Appl. No. 09/850,914, Aug. 7, 2006 Response to Non-Final Office Action.
U.S. Appl. No. 09/850,914, Feb. 3, 2006 Non-Final Office Action.
U.S. Appl. No. 09/850,914, Oct. 31, 2005 Response to Non-Final Office Action.
U.S. Appl. No. 09/850,914, May 4, 2005 Non-Final Office Action.
U.S. Appl. No. 09/850,914, Feb. 2, 2005 Amendment and Request for Continued Examination (RCE).
U.S. Appl. No. 09/850,914, Jan. 6, 2005 Advisory Action.
U.S. Appl. No. 09/850,914, Dec. 2, 2004 Response to Final Office Action.
U.S. Appl. No. 09/850,914, Jul. 28, 2004 Final Office Action.
U.S. Appl. No. 09/850,914, Apr. 23, 2004 Response to Non-Final Office Action.
U.S. Appl. No. 09/850,914, Nov. 21, 2003 Non-Final Office Action.
U.S. Appl. No. 09/067,015, Jul. 13, 2001 Issue Fee Payment.
U.S. Appl. No. 09/067,015, May 7, 2001 Notice of Allowance.
U.S. Appl. No. 09/067,015, Mar. 15, 2001 Preliminary Amendment, Express Abandonment and Request for Continued Examination (RCE).
U.S. Appl. No. 09/067,015, Dec. 15, 2000 Notice of Allowance.
U.S. Appl. No. 09/067,015, Oct. 23, 2000 Advisory Action.
U.S. Appl. No. 09/067,015, Oct. 11, 2000 Supplemental Response, Preliminary Amendment, Express Abandonment and Continuing Prosecution Application (CPA).
U.S. Appl. No. 09/067,015, Sep. 28, 2000 Response to Final Office Action.
U.S. Appl. No. 09/067,015, Apr. 11, 2000 Final Office Action.
U.S. Appl. No. 09/067,015, Jan. 28, 2000 Response to Non-Final Office Action.
U.S. Appl. No. 09/067,015, Sep. 27, 1999 Non-Final Office Action.
U.S. Appl. No. 09/055,934, Jun. 5, 2000 Issue Fee Payment.
U.S. Appl. No. 09/055,934, Mar. 28, 2000 Notice of Allowance.
U.S. Appl. No. 09/055,934, Mar. 2, 2000 Withdrawal of Notice of Allowance.
U.S. Appl. No. 09/055,934, Feb. 22, 2000 Continuing Prosecution Application (CPA).
U.S. Appl. No. 09/055,934, Nov. 22, 1999 Notice of Allowance.
U.S. Appl. No. 09/055,934, Sep. 13, 1999 Response to Non-Final Office Action.
U.S. Appl. No. 09/055,934, May 10, 1999 Non-Final Office Action.
U.S. Appl. No. 09/297,714, Nov. 13, 2002 Issue Fee Payment.
U.S. Appl. No. 09/297,714, Sep. 16, 2002 Notice of Allowance.
U.S. Appl. No. 09/530,085, May 22, 2007 Notice of Abandonment.
U.S. Appl. No. 09/530,085, Oct. 30, 2006 Final Office Action.
U.S. Appl. No. 09/530,085, Aug. 2, 2006 Response to Non-Final Office Action.
U.S. Appl. No. 09/530,085, May 2, 2006 Non-Final Office Action.
U.S. Appl. No. 09/530,085, Mar. 2, 2006 Amendment and Request for Continued Examination (RCE).
U.S. Appl. No. 09/530,085, Feb. 16, 2006 Advisory Action.
U.S. Appl. No. 09/530,085, Nov. 17, 2005 Response to Final Office Action.
U.S. Appl. No. 09/530,085, Nov. 10, 2005 Examiner Interview Summary.
U.S. Appl. No. 09/530,085, Jun. 14, 2005 Final Office Action.
U.S. Appl. No. 09/530,085, Jan. 10, 2005 Response to Non-Final Office Action.
U.S. Appl. No. 09/530,085, Jul. 9, 2004 Non-Final Office Action.
U.S. Appl. No. 09/530,085, May 24, 2004 Amendment and Request for Continued Examination (RCE).

U.S. Appl. No. 09/530,085, Apr. 2, 2004 Advisory Action.
U.S. Appl. No. 09/530,085, Mar. 22, 2004 Response to Final Office Action.
U.S. Appl. No. 09/530,085, Dec. 22, 2003 Non-Final Office Action.
U.S. Appl. No. 09/530,085, Oct. 2, 2003 Response to Non-Final Office Action.
U.S. Appl. No. 09/530,085, Mar. 27, 2003 Non-Final Office Action.
U.S. Appl. No. 08/723,467, Sep. 9, 1999 Examiner Interview Summary.
U.S. Appl. No. 08/723,467, Mar. 19, 1999 Issue Fee Payment.
U.S. Appl. No. 08/723,467, Jan. 20, 1999 Notice of Allowance.
U.S. Appl. No. 08/723,467, Jan. 5, 2009 Examiner Interview Summary.
U.S. Appl. No. 08/723,467, Dec. 28, 1998 Filed Notice of Appeal.
U.S. Appl. No. 08/723,467, Dec. 11, 1998 Response to Final Office Action.
U.S. Appl. No. 08/723,467, Jun. 18, 1998 Final Office Action.
U.S. Appl. No. 08/723,467, Mar. 26, 1998 Response to Non-Final Office Action.
U.S. Appl. No. 08/723,467, Dec. 8, 1997 Non-Final Office Action.
U.S. Appl. No. 09/055,929, Feb. 22, 2000 Issue Fee Payment.
U.S. Appl. No. 09/055,929, Nov. 22, 1999 Notice of Allowance.
U.S. Appl. No. 09/055,929, Sep. 13, 1999 Response to Non-Final Office Action.
U.S. Appl. No. 09/055,929, May 10, 1999 Non-Final Office Action.
U.S. Appl. No. 09/240,509, Sep. 11, 2006 Issue Fee Payment.
U.S. Appl. No. 09/240,509, Jun. 8, 2006 Notice of Allowance.
U.S. Appl. No. 09/240,509, Mar. 31, 2006 BPAI Decision—Examiner Reversed.
U.S. Appl. No. 09/240,509, Dec. 28, 2004 Filed Reply Brief.
U.S. Appl. No. 09/240,509, Oct. 21, 2004 Examiner's Answer to Appeal Brief.
U.S. Appl. No. 09/240,509, Jul. 2, 2004 Filed Appeal Brief.
U.S. Appl. No. 09/240,509, Jan. 9, 2004 Filed Notice of Appeal.
U.S. Appl. No. 09/240,509, Nov. 24, 2003 Advisory Action.
U.S. Appl. No. 09/240,509, Oct. 9, 2003 Response to Final Office Action.
U.S. Appl. No. 09/240,509, Jul. 7, 2003 Final Office Action.
U.S. Appl. No. 09/240,509, Apr. 21, 2003 Response to Non-Final Office Action.
U.S. Appl. No. 09/240,509, Jan. 28, 2003 Examiner Interview Summary.
U.S. Appl. No. 09/240,509, Nov. 6, 2002 Non-Final Office Action.
U.S. Appl. No. 09/240,509, Sep. 9, 2002 Response to Non-Final Office Action.
U.S. Appl. No. 09/240,509, Mar. 11, 2002 Final Office Action.
U.S. Appl. No. 09/240,509, Jan. 10, 2002 Response to Non-Final Office Action.
U.S. Appl. No. 09/240,509, Oct. 2, 2001 Non-Final Office Action.
U.S. Appl. No. 09/240,509, Sep. 22, 1999 Continued Prosecution Application (CPA).
U.S. Appl. No. 09/530,085, Dec. 22, 2003 Final Office Action.
U.S. Appl. No. 10/149,711, Sep. 16, 2008 Notice of Abandonment.
U.S. Appl. No. 10/149,711, Mar. 7, 2008 Non-Final Office Action.
U.S. Appl. No. 11/688,368, Apr. 26, 2011 Final Office Action.
U.S. Appl. No. 11/688,368, Feb. 16, 2011 Response to Non-Final Office Action.
U.S. Appl. No. 11/688,368, Sep. 16, 2010 Non-Final Office Action.
U.S. Appl. No. 11/688,368, Jul. 20, 2010 Amendment and Request for Continued Examination (RCE).
U.S. Appl. No. 11/688,368, Mar. 23, 2010 Final Office Action.
U.S. Appl. No. 11/688,368, Dec. 21, 2009 Reponse to Non-Final Office Action.
U.S. Appl. No. 11/688,368, Aug. 20, 2009 Non-Final Office Action.
U.S. Appl. No. 11/688,368, Sep. 24, 2008 Preliminary Amendment.
U.S. Appl. No. 11/688,368, Mar. 13, 2012 Non-Final Office Action.
U.S. Appl. No. 13/345,208, filed Jan. 6, 2012.
U.S. Appl. No. 11/688,368, Oct. 24, 2011 Amendment and Request for Continued Examination (RCE).
U.S. Appl. No. 12/482,292, Jan. 17, 2012 Issue Fee payment.
U.S. Appl. No. 11/688,368, Jul. 13, 2012 Terminal Disclaimer Review Decision.
U.S. Appl. No. 11/688,368, Jul. 12, 2012 Response to Non-Final Office Action and Terminal Disclaimer filed.
U.S. Appl. No. 13/767,632, filed Feb. 14, 2013.
U.S. Appl. No. 13/767,632, Mar. 27, 2013 Non-Final Office Action.
U.S. Appl. No. 13/345,208, Mar. 4, 2013 Non-Final Office Action.
U.S. Appl. No. 11/688,368, Feb. 14, 2013 Issue Fee payment.
U.S. Appl. No. 11/688,368, Feb. 11, 2013 Notice of Allowance.
U.S. Appl. No. 11/688,368, Dec. 6, 2012 Response to Final Office Action.
U.S. Appl. No. 11/688,368, Nov. 21, 2012 Final Office Action.

| Node ID | Node param | ... | Node param |

| Comp Obj ID (0X0001) | Root node (RN) | No. children | Child node (CN) | ... | Child node (CN) |

FIG. 3

| Comp Obj (0X0002) | Table size | Stream ID | Node ID | ... | Stream ID | Node ID |

FIG. 4

| Comp Obj (0X0003) | Update type (0x00-delete) | Node ID |

| Comp Obj (0X0003) | Update type (0x01-add) | Parent Node ID | Node |

| Comp Obj (0X0003) | Update type (0x00-modify) | Node ID | No. Param | Param index | Value | ... | Param index | Value |

FIG. 5

OBJECT-BASED AUDIO-VISUAL TERMINAL AND BITSTREAM STRUCTURE

CROSS-REFERENCE TO RELATED APPLICATIONS

This application is a continuation of U.S. patent application Ser. No. 12/482,292, filed Jun. 10, 2009, now U.S. Pat. No. 8,115,871 which is a U.S. patent application Ser. No. 11/688,368, filed Mar. 20, 2007, now U.S. Pat. No. 8,421,923, which is a divisional of U.S. patent application Ser. No. 09/367,433, filed Jan. 13, 2000, now U.S. Pat. No. 7,199,836 which is a national stage of International Application PCI/US98/02668, filed Feb. 13, 1998, which claims the benefit of U.S. Provisional Application Ser. No. 60/037,779, filed Feb. 14, 1997, each of which is incorporated by reference in its entirety herein, and from which priority is claimed.

TECHNICAL FIELD

This invention relates to the representation, transmission, processing and display of video and audio-visual information, more particularly of object-based information.

BACKGROUND OF THE INVENTION

Image and video compression techniques have been developed which, unlike traditional waveform coding, attempt to capture high-level structure of visual content. Such structure is described in terms of constituent "objects" which have immediate visual relevancy, representing familiar physical objects, e.g. a ball, a table, a person, a tune or a spoken phrase. Objects are independently encoded using a compression technique that gives best quality for each object. The compressed objects are sent to a terminal along with composition information which tells the terminal where to position the objects in a scene. The terminal decodes the objects and positions them in the scene as specified by the composition information. In addition to yielding coding gains, object-based representations are beneficial with respect to modularity, reuse of content, ease of manipulation, ease of interaction with individual image components, and integration of natural, camera-captured content with synthetic, computer-generated content.

SUMMARY OF THE INVENTION

In a preferred architecture, structure or format for information to be processed at an object-based video or audio-visual (AV) terminal, an object-oriented bitstream includes objects, composition information, and scene demarcation information. The bitstream structure allows on-line editing, e.g. cut and paste, insertion/deletion, grouping, and special effects.

In the preferred architecture, in the interest of ease of editing, AV objects and their composition information are transmitted or accessed on separate logical channels (LCs). The architecture also makes use of "object persistence", taking advantage of some objects having a lifetime in the decoder beyond their initial presentation time, until a selected expiration time.

BRIEF DESCRIPTION OF THE DRAWING

FIG. 3 is a schematic of exemplary node and scene description information using composition.

FIG. 4 is a schematic of exemplary stream-node association information.

FIG. 5 is a schematic of exemplary node/graph update information using a scene.

DETAILED DESCRIPTION

An audio-visual (AV) terminal is a systems component which is instrumental in forming, presenting or displaying audio-visual content. This includes (but is not limited to) end-user terminals with a monitor screen and loudspeakers, as well server and mainframe computer facilities in which audio-visual information is processed. In an AV terminal, desired functionality can be hardware-, firmware- or software-implemented. Information to be processed may be furnished to the terminal from a remote information source via a telecommunications channel, or it may be retrieved from a local archive, for example. An object-oriented audio-visual terminal more specifically receives information in the form of individual objects, to be combined into scenes according to composition information supplied to the terminal.

Figures 1, 2A, 2B, 2C:
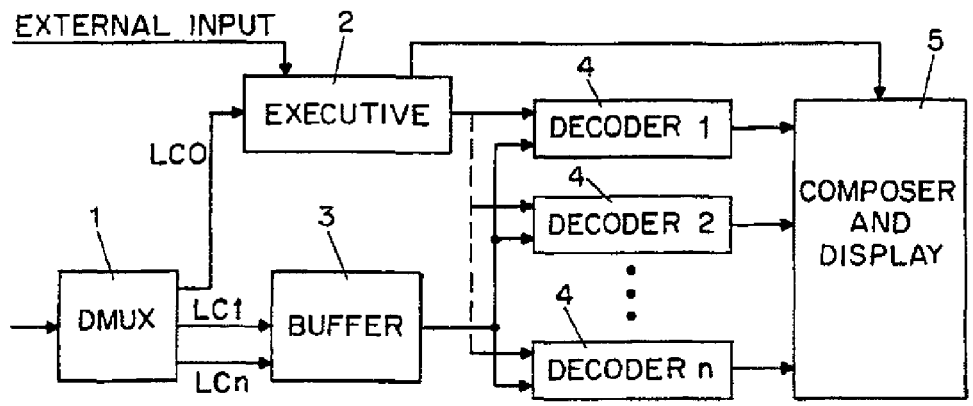
FIG. 1 is a functional schematic of an exemplary object-based audio-visual terminal.
FIG. 2a is a schematic of an exemplary object-based audio-visual composition packet.
FIG. 2b is a schematic of an exemplary object-based audio-visual data packet.
FIG. 2c is a schematic of an exemplary compound composition packet.

FIG. 1 illustrates such a terminal, including a de-multiplexer (DMUX) 1 connected via a logical channel LC0 to a system controller or "executive" 2 and via logical channels LC1 through LCn to a buffer 3. The executive 2 and the buffer 3 are connected to decoders 4 which in turn are connected to a composer unit 5. Also, the executive 2 is connected to the composer unit 5 directly, and has an external input for user interaction, for example.

In the preferred AV architecture, the AV objects and their composition information are transmitted or accessed on separate logical channels. The DMUX receives the Mux2 layer from the lower layers and de-multiplexes it into logical channels. LC0 carries composition information which is passed on to the executive. The AV objects received on other logical channels are stored in the buffer to be acted upon by the decoders. The executive receives the composition information, which includes the decoding and presentation time stamps, and instructs the decoders and composer accordingly.

The system handles object composition packets (OCP) and object data packets (ODP). A composition packet contains an object's ID, time stamps and the "composition parameters" for rendering the object. An object data packet contains an object ID, an expiration time stamp in case of persistent objects, and object data.

Preferably, any external input such as user interaction is converted to OCP and/or ODP before it is presented to the executive. There is no need for headers in a bitstream delivered over a network. However, headers are required when storing an MPEG4 presentation in a file.

FIGS. 2a and 2b illustrate the structure of composition and data packets in further detail. Relevant features are as follows:

Object ID is composed of object type and object number. The default length of the Object ID is 2 bytes, including ten bits for the object number and 6 for the object type (e.g. text, graphics, MPEG2 VOP, compound object). An extensible code is used to accommodate more than 1023 objects or more than 31 object types. The following convention will be adhered to: a value of 0b111111 in the first six bits of the Object ID corresponds to 31 plus the value of the byte immediately following the ObjectID; a value of 0b11.1111.1111 in the least significant 10 bits of the Object ID corresponds to 1023 plus the value of the two bytes immediately following the Object ID (without counting the object type extension bytes, if present). The following object types are defined:

| Composition Objects (16-bit object IDs) | |
|---|---|
| 0X0000 | scene configuration object |
| 0X0001 | node hierarchy specification |
| 0X0002 | stream-node association |
| 0X0003 | node/scene update |
| 0X0004 | compound object |
| Object Data (object type, 6 most significant bits) | |
| 0b00.0010 | text |
| 0b00.0011 | MPEG2 VOP (rectangular VOP) |

Persistent Objects (PO) are objects that should be saved at the decoder for use at a later time. An expiration time stamp (ETS) gives the life of a PO in milliseconds. A PO is not available to the decoder after ETS runs out. When a PO is to be used at a later time in a scene, only the corresponding composition information needs to be sent to the AV terminal.

Decoding Time Stamp (DTS) indicates the time an object (access unit) should be decoded by the decoder.

Presentation Time Stamp (PTS) indicates the time an object (access unit) should be presented by the decoder.

Lifetime Time Stamp (LTS) gives the duration (in milliseconds) an object should be displayed in a scene. LTS is implicit in some cases, e.g. in a video sequence where a frame is displayed for 1/frame-rate or until the next frame is available, whichever is larger. An explicit LTS is used when displaying graphics and text. An AV object should be decoded only once for use during its life time.

Expiration Time Stamp (ETS) is specified to support the notion of object persistence. An object, after it is presented, is saved at the decoder (cache) until a time given by ETS. Such an object can be used multiple times before ETS runs out. A PO with an expired ETS is no longer available to the decoder.

Object Time Base (OTB) defines the notion of time of a given AV object encoder. Different objects may belong to different time bases. The AV terminal adapts these time bases to the local one, as specified in the MSDL VM.

Object Clock Reference (OCR) can be used if necessary to convey the speed of the OTB to the decoder. By this mechanism, OTBs can be recovered/adapted at the AV terminal.

Composition Parameters are used to compose a scene (place an object in a scene). These include displacement from the upper left corner of the presentation frame, rotation angles, zooming factors, etc.

Priority indicates the priority of an object for transmission, decoding, and display. MPEG4 supports 32 levels of priority. Lower numbers indicate higher priorities.

Persistence Indicator (PI) indicates whether an object is persistent.

Continuation Indicator (CI) indicates the end of an object in the current packet (or continuation).

Object Grouping facilitates operations to be applied to a set of objects with a single operation. Such a feature can be used to minimize the amount of composition information sent, as well as to support hierarchical scene composition based on independent sub-scenes. The composer manipulates the component objects as a group. The structure of a compound composition packet (CCP) is shown in FIG. 2c.

Bitstream Structure includes object composition packets for describing the composition and controlling the presentation of those packets, and object data packets that contain the data for the objects. A scene is composed by a set of composition packets. The bitstream supports representation of scenes as a hierarchy by using compound composition objects (CCP), also known as node hierarchy. A CCP allows combining composition objects to create complex audio-visual scenes.

Object-Data Packet:
ObjectID—min (default) 10 bits
CI and PI could be combined:
    00—begin non-persistent
    01—begin persistent
    10—continuation
    11—end of object
Priority: 5 bits, present only if CI/PI is 0b00 or 0b01
ETS: 30 bits, present if CI/PI is 0b01
For prediction-based video coding, VOP_type is indicated by two bits (00 (I), 01 (P), 10 (B), 11 (PB)), facilitating editing.

```
Object_data_packet{
    ObjectID                16 bits + any extensions;
    CIPI 2 bits
    if (CIPI <= 1){
    Priority                5 bits
    if (object type is MPEG VOP)
            (any prediction based compression)
            VOP_type        2 bits
    }
    if (CIPI == 1)
    ETS                     28 bits
    ObjectData
}
```

Object Composition Packet

```
Object_composition_packet{
    ObjectID                16 bits + any extensions
    OCR_Flag                1 bit
    Display_Timers_Flag     1 bit
    DTS                     30 bits
    if (OCR_Flag)
        OCR                 30 bits
    if (Display_Timers_Flag){
        PTS                 30 bits
        LTS                 28 bits
    }
    Composition_parameters;
}
```

Composition Parameters are defined in section 2 of MSDL Verification Model, MPEG N1483, Systems Working Draft V2.0, the disclosure of which is incorporated herein by reference.

```
Composition_parameters(
    visibility                  1 bit
    composition_order           5 bits
    number_of_motion_sets       2 bits
    x_delta_0                   12 bits
    y_delta_0                   12 bits
    for (i = 1; i <= number_of_motion_sets; i++){
```

-continued

```
        x_delta_i         12 bits
        y_delta_i         12 bits
    }
}
```

Compound Composition Packet

```
Compound_composition_packet{
    ObjectID                   16 bits
    PTS                        30 bits
    LTS                        28 bits
    Composition_parameters
    ObjectCount                8 bits
    for    (i = 0; i < ObjectCount; i++){
        Object_composition_packet;
    }
}
```

Scene Configuration Packet (SCP) is used to change reference scene width, height, to flush the buffer, and other configuration functions. The object type for SCPs is 0b00.0000. This allows for 1024 different configuration packets. The object number 0b00.0000.0000 (object ID 0X0000) is defined for use with flushing the terminal buffers.

Composition Control for Buffer Management (Object ID 0x0000)

AV terminal buffers are flushed using Flush_Cache and Scene_Update flags. When using hierarchical scene structure, the current scene graph is flushed and the terminal loads the new scene from the bitstream. Use of flags allows for saving the current scene structure instead of flushing it. These flags are used to update the reference scene width and height whenever a new scene begins. If the Flush_Cache_Flag is set, the cache is flushed, removing the objects (if any). If Scene_Update_Flag is set, there are two possibilities: (i) Flush_Cache-Flag is set, implying that the objects in the cache will no longer be used; (ii) Flush_Cache_Flag is not set, the new scene being introduced (an editing action on the bitstream) splices the current scene and the objects in the scene will be used after the end of the new scene. The ETS of the objects, if any, will be frozen for the duration of the new scene introduced. The beginning of the next scene is indicated by another scene configuration packet.

```
Scene_configuration_packet{
    ObjectID                   16 bits (OXOOOO)
        Flush_Cache_Flag       1 bit
        Scene_Update_Flag      1 bit
        if (Scene_Update_Flag){
            ref_scene_width    12 bits
            ref_scene_height   12 bits
        }
}
```

Composition Control for Scene Description (Object ID 0X0001)

A hierarchy of nodes is defined, describing a scene. The scene configuration packets can also be used to define a scene hierarchy that allows for a description of scenes as a hierarchy of AV objects. Each node in such a graph is a grouping of nodes that groups the leaves and/or other nodes of the graph into a compound AV object. Each node (leaf) has a unique ID followed by its parameters as shown in FIG. 3.

Composition Control for Stream-Node Mapping (Object ID 0X0002)

As illustrated by FIG. 4, table entries associate the elementary object streams in the logical channels to the nodes in a hierarchical scene. The stream IDs are unique, but not the node IDs. This implies that more than one stream can be associated with the same node.

Composition Control for Scene Updates (Object ID 0x0003)

FIG. 5 illustrates updating of the nodes in the scene hierarchy, by modifying the specific parameters of the node. The graph itself can be updated by adding/deleting the nodes in the graph. The update type in the packet indicates the type of update to be performed on the graph.

Architectural Embodiment

The embodiment described below includes an object-based AV bitstream and a terminal architecture. The bitstream design specifies, in a binary format, how AV objects are represented and how they are to be composed. The AV terminal structure specifies how to decode and display the objects in the binary bitstream.

AV Terminal Architecture

Figure 6:
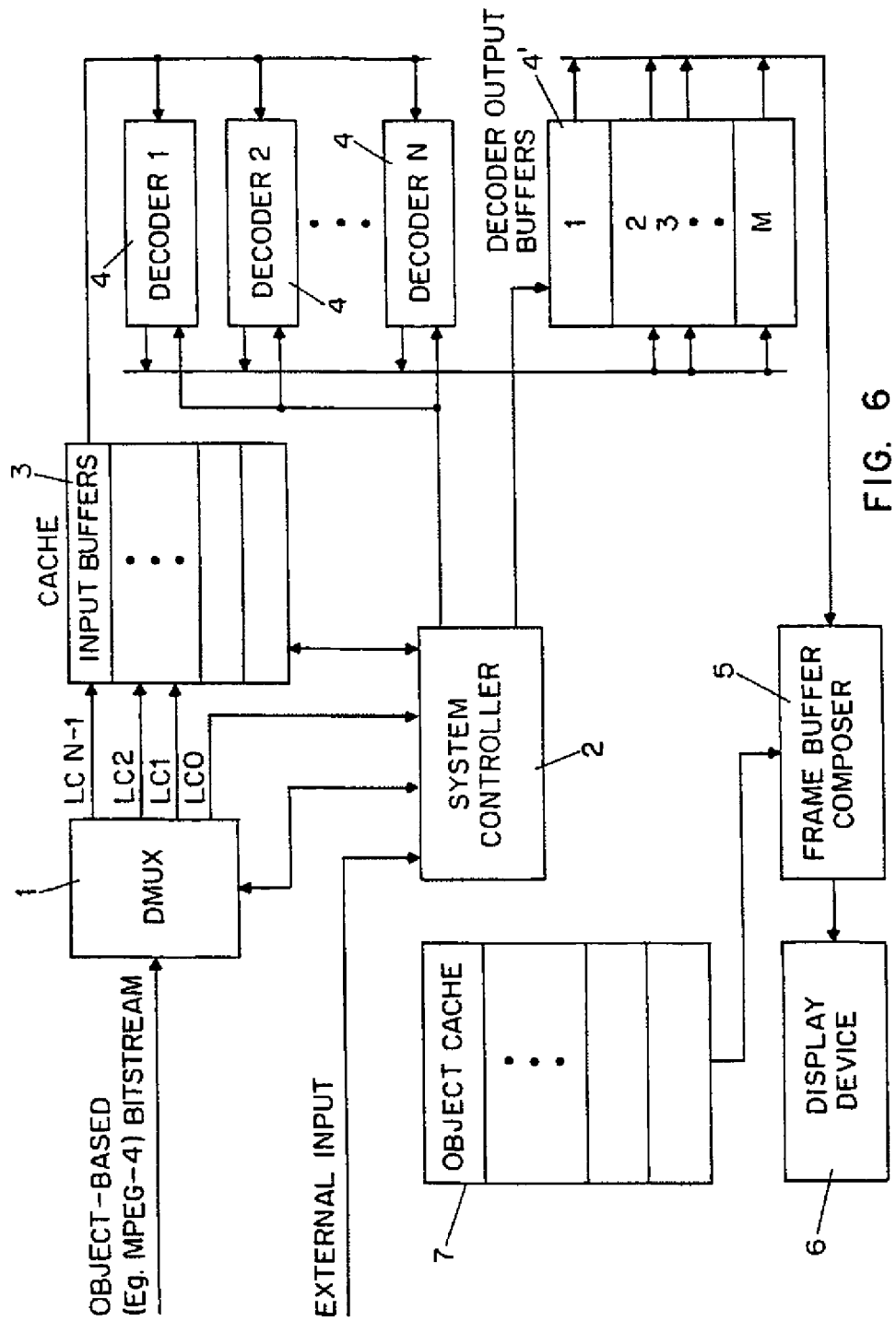
FIG. 6 is a schematic of an exemplary audio-visual terminal design.

Further to FIG. 1 and with specific reference to FIG. 6, the input to the de-multiplexer 1 is an object-based bitstream such as an MPEG-4 bitstream, consisting of AV objects and their composition information multiplexed into logical channels (LC). The composition of objects in a scene can be specified as a collection of objects with independent composition specification, or as a hierarchical scene graph. The composition and control information is included in LC0. The control information includes control commands for updating scene graphs, reset decoder buffers etc. Logical channels 1 and above contain object date. The system includes a controller (or "executive") 2 which controls the operation of the AV terminal.

The terminal further includes input buffers 3, AV object decoders 4, buffers 4' for decoded data, a composer 5, a display 6, and an object cache 7. The input bitstream may be read from a network connection or from a local storage device such as a DVD, CD-ROM or computer hard disk. LC0 containing the composition information is fed to the controller. The DMUX stores the objects in LC1 and above at the location in the buffer specified by the controller. In the case of network delivery, the encoder and the stream server cooperate to ensure that the input object buffers neither overflow nor underflow. The encoded data objects are stored in the input data buffers until read by the decoders at their decoding time, typically given by an associated decoding timestamp. Before writing a data object to the buffer, the DMUX removes the timestamps and other headers from the object data packet and passes them to the controller for signaling of the appropriate decoders and input buffers. The decoders, when signaled by the controller, decode the data in the input buffers and store them in the decoder output buffers. The AV terminal also handles external input such as user interaction.

In the object cache 7, objects are stored for use beyond their initial presentation time. Such objects remain in the cache even if the associated node is deleted from the scene graph, but are removed only upon the expiration of an associated time interval called the expiration time stamp. This feature can be used in presentations where an object is used repeatedly over a session. The composition associated with such objects can be updated with appropriate update messages. For example, the logo of the broadcasting station can be downloaded at the beginning of the presentation and the same copy can be used for repeated display throughout a session. Subsequent composition updates can change the position of the logo on the display. Objects that are reused beyond their first presentation time may be called persistent objects.

System Controller (SC)

The system controller controls decoding and playback of bitstreams on the AV terminal. At startup, from user interaction or by looking for a session at default network address, the SC first initializes the DMUX to read from a local storage device or a network port. The control logic is loaded into the program RAM at the time of initialization. The instruction decoder reads the instructions from the program and executes them. Execution may involve reading the data from the input buffers (composition or external data), initializing the object timers, loading or updating the object tables to the data RAM, loading object timers, or control signaling.

Figure 7:
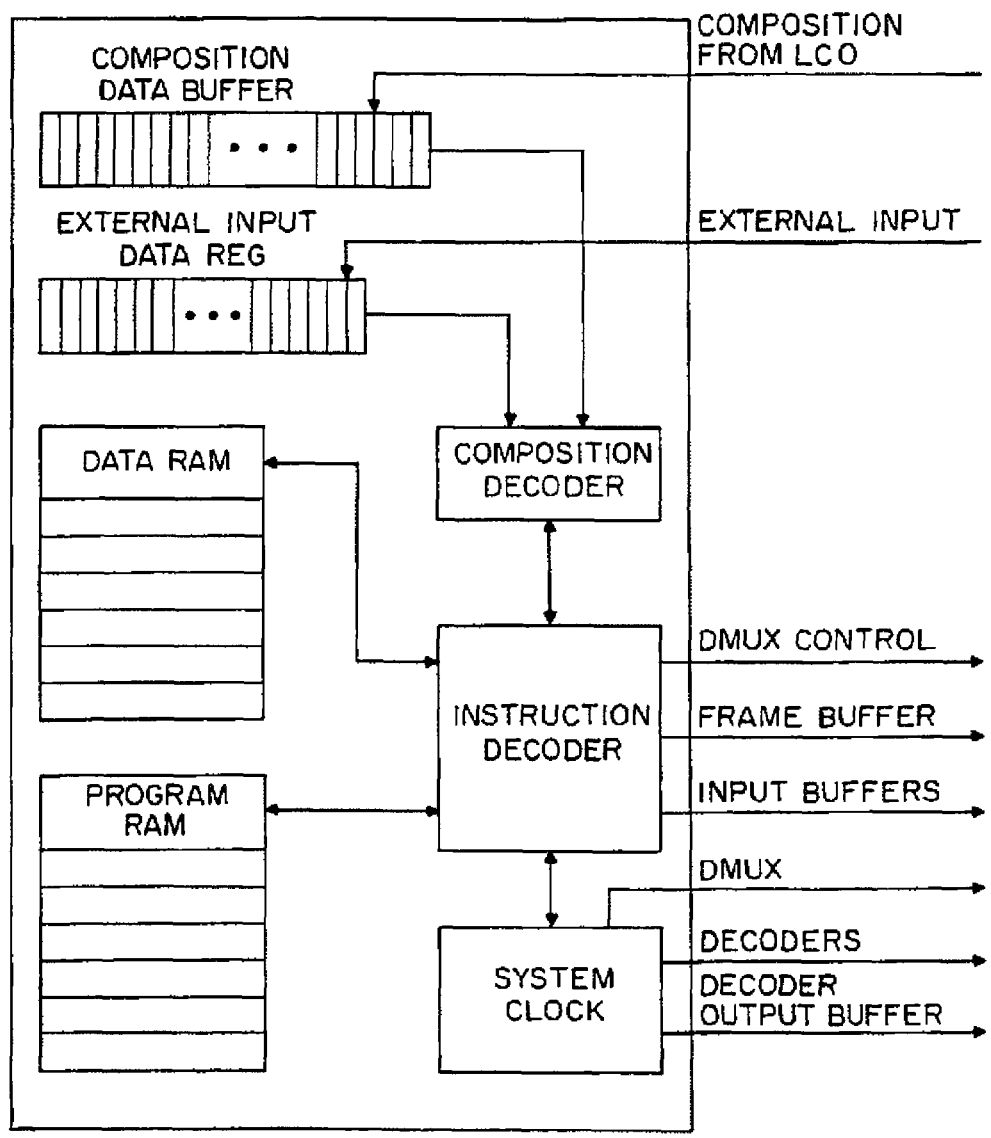
FIG. 7 is a schematic of an exemplary audio-visual system controller in the terminal according to FIG. 6.

FIG. 7 shows the system controller in further detail. The DMUX reads the input bitstream and feeds the composition data on LC0 to the controller. The composition data begins with the description of the first scene in the AV presentation. This scene can be described as a hierarchical collection of objects using compound composition packets, or as a collection of independent object composition packets. A table that associates the elementary streams with the nodes in the scene description immediately follows the scene description. The controller loads the object IDs (stream IDs) into object list and render list which are maintained in the data RAM. The render list contains the list of objects that are to be rendered on the display device. An object that is disenabled by user interaction is removed from the render list. A node delete command that is sent via a composition control packet causes the deletion of the corresponding object IDs from the object list. The node hierarchy is also maintained in the data RAM and updated whenever a composition update is received.

The composition decoder reads data from the composition and external data buffer and converts them into a format understood by the instruction decoder. The external input includes user interaction to select objects, disenable and enable objects and certain predefined operations on the objects. During the execution of the program, two lists are formed in the data RAM. The object list, containing a list of objects (object IDs) currently handled by the decoders and a render list, containing the list of active objects in the scene. These lists are updated dynamically as the composition information is received. For example, if a user chooses to hide an object by passing a command via the external input, the object is removed from the render list until specified by the user. This is also how external input is handled by the system. Whenever there is some external interaction, the composition decoder reads the external data buffer and performs the requested operation.

The SC also maintains timing for each AV object to signal the decoders and decoder buffers of decoding and presentation time. The timing information for the AV objects is specified in terms of its time-base. The terminal uses the system clock to convert an object's time base into system time. For objects that do not need decoding, only presentation timers are necessary. These timers are loaded with the decoding and presentation timestamps for that AV object. The controller obtains the timestamps from the DMUX for each object. When a decoding timer for an object runs out, the appropriate decoder is signaled to read data from the input buffers and to start the decoding process. When a presentation timer runs out, the decoded data for that object is transferred to the frame buffer for display. A dual buffer approach could be used to allow writing to a frame buffer while the contents of the second buffer are displayed on the monitor. The instruction decoder can also reset the DMUX or input buffers by signaling a reset, which initializes them to the default state.

Information Flow in the Controller

Figure 8:
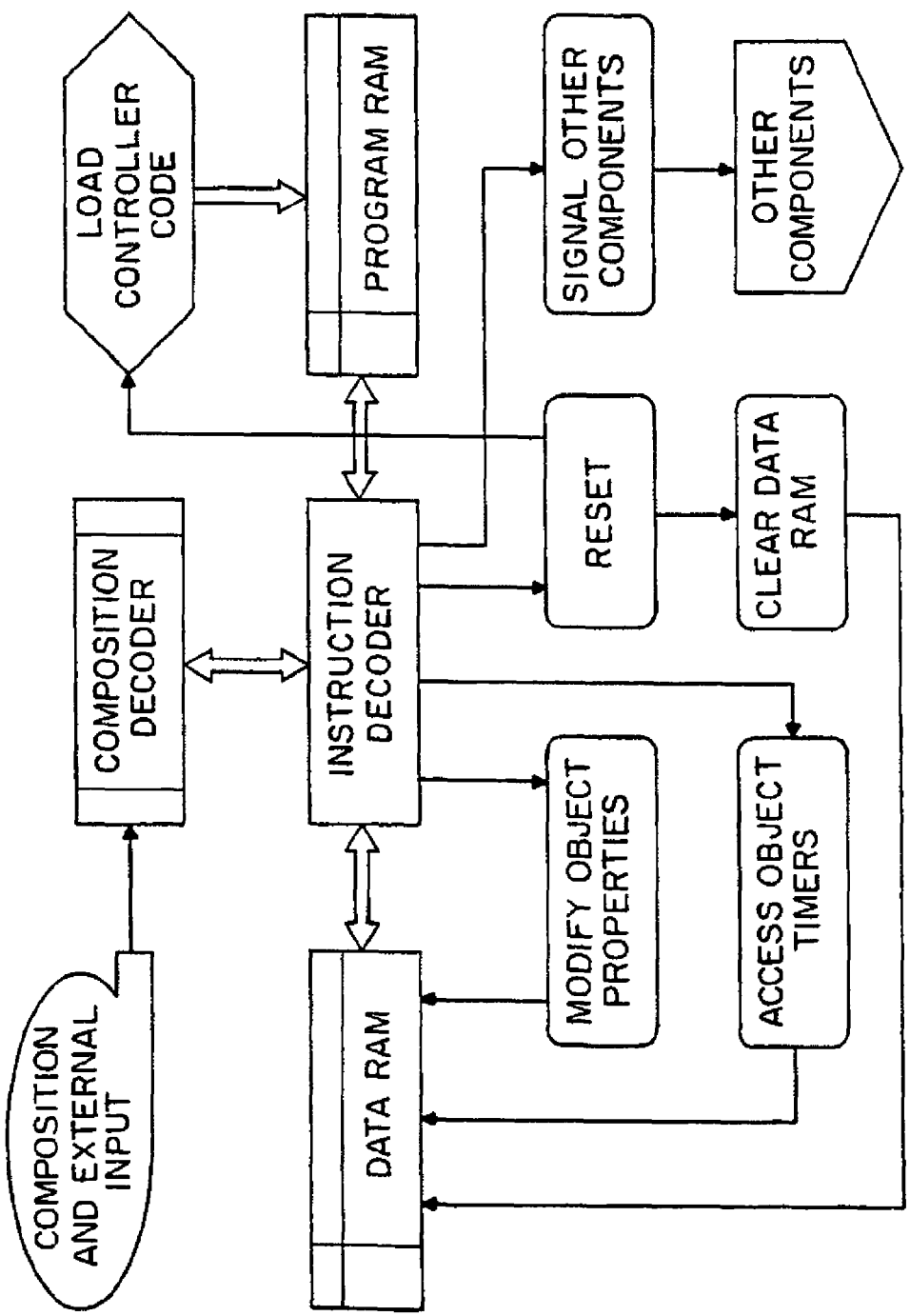
FIG. 8 is a schematic of exemplary information flow in the controller according to FIG. 7.

FIG. 8 shows the flow of information in the controller. To keep the figure simple, the operations performed by the instruction decoder are shown in groups. The three groups respectively concern object property modifications, object timing, and signaling.

Object Property Modifications

These operations manipulate the object IDs, also called elementary stream IDs. When a scene is initially loaded, a scene graph is formed with the object IDs of the objects in the scene. The controller also forms and maintains a list of objects in the scene (object list) and active objects in the object from the render list. Other operations set and update object properties such as composition parameters when the terminal receives a composition packet.

Object Timing

This group of operations deals with managing object timers for synchronization, presentation, and decoding. An object's timestamp specified in terms of its object time base is converted into system time and the presentation and decoding time of that object are set. These operations also set and reset expiration timestamps for persistent objects.

Signaling

Signaling operations control the over-all operation of the terminal. Various components of the terminal are set, reset and operated by controller signaling. The controller checks the decoding and presentation times of the objects in the render list and signals the decoders and presentation frame buffers accordingly. It also initializes the DEMUX for reading from a network or a local storage device. At the instigation of the controller, decoders read the data from the input buffers and pass the decoded data to decoder output buffers. The decoded data is moved to the presentation device when signaled by the controller.

We claim:

1. A method for processing video data, comprising:
    receiving in a data bitstream, over time, video information and composition information, wherein said video information includes one or more objects, each object being individually encoded, wherein said composition information includes decoding time information and presentation time information;
    processing said composition information received in the data bitstream to compose a single video from said video information, wherein the individually encoded one or more objects are composed within a presentation frame of the single video; and
    outputting said single video.

2. The method of claim 1, wherein said one or more objects has immediate visual relevancy.

3. The method of claim 1, wherein said one or more objects represents one or more corresponding physical objects.

4. The method of claim 1, further comprising:
    storing said video information in memory.

5. The method of claim 4, wherein said memory is a cache memory.

6. The method of claim 4, further comprising:
    storing said video information beyond its initial presentation time.

7. A system for processing video data, comprising:
    a controller circuit for receiving in a data bitstream, over time, video information and composition information, wherein said video information includes one or more objects, each object being individually encoded, wherein said composition information includes decoding time information and presentation time information;

a composer circuit for processing said composition information received in the data bitstream to compose a single video from said video information, wherein the individually encoded one or more objects are composed within a presentation frame of the single video; and an output circuit for outputting said single video.

8. The system of claim 7, wherein said one or more objects has immediate visual relevancy.

9. The system of claim 7, wherein said one or more objects represents physical objects.

10. The system of claim 7, further comprising:
a storage circuit for storing said video information in memory.

11. The system of claim 10, wherein said memory is a cache memory.

12. The system of claim 10, wherein the storage circuit is further configured to store said video information beyond its initial presentation time.

13. A non-transitory computer-readable medium including one or more instructions that cause a computer processor to perform the steps comprising:
receiving in a data bitstream, over time, video information and composition information, wherein said video information includes one or more objects, each object being individually encoded, wherein said composition information includes decoding time information and presentation time information;

processing said composition information received in the data bitstream to compose a single video from said video information, wherein the individually encoded one or more objects are composed within a presentation frame of the single video; and outputting said single video.

14. The computer-readable medium of claim 13, wherein said one or more objects has immediate visual relevancy.

15. The computer-readable medium of claim 13, wherein said one or more objects represents physical objects.

16. The computer-readable medium of claim 13, further comprising:
storing said video information in memory.

17. The computer-readable medium of claim 16, wherein said memory is a cache memory.

18. The computer-readable medium of claim 16, further comprising:
storing said video information beyond its initial presentation time.

* * * * *